United States Patent
Artigalas et al.

(10) Patent No.: US 6,470,411 B2
(45) Date of Patent: *Oct. 22, 2002

(54) METHOD AND DEVICE FOR ACCESSING SETS OF DATA CONTAINED IN MASS MEMORY

(75) Inventors: Max Artigalas, Le Chesnay; Paul-Louis Meunier, Paris, both of (FR)

(73) Assignee: Thomson Licensing S.A., Boulogne-Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,915

(22) Filed: Apr. 13, 1998

(65) Prior Publication Data

US 2002/0029318 A1 Mar. 7, 2002

(30) Foreign Application Priority Data

Apr. 16, 1997 (FR) ............................................ 97 04687

(51) Int. Cl.⁷ ............................................... G06F 12/00
(52) U.S. Cl. ................................ 711/4; 711/111; 701/1; 380/211
(58) Field of Search ........................... 711/111, 4, 114; 386/75; 707/1; 709/215; 380/211

(56) References Cited

U.S. PATENT DOCUMENTS

| | | | | |
|---|---|---|---|---|
| 4,791,622 A | * | 12/1988 | Clay et al. | 369/59 |
| 5,206,939 A | * | 4/1993 | Yanai et al. | 711/4 |
| 5,214,768 A | * | 5/1993 | Martin et al. | 711/114 |
| 5,237,461 A | * | 8/1993 | Heitmann et al. | 386/75 |
| 5,325,508 A | * | 6/1994 | Parks et al. | 711/118 |
| 5,423,014 A | * | 6/1995 | Hinton et al. | 711/3 |
| 5,530,754 A | * | 6/1996 | Garfinkle | 380/5 |
| 5,586,264 A | * | 12/1996 | Belknap et al. | 709/219 |
| 5,588,129 A | * | 12/1996 | Ballard | 711/113 |
| 5,708,803 A | * | 1/1998 | Ishimi et al. | 712/233 |
| 5,732,256 A | * | 3/1998 | Smith | 707/1 |
| 5,909,692 A | * | 6/1999 | Yanai et al. | 711/4 |
| 5,930,523 A | * | 7/1999 | Kawasaki et al. | 712/32 |
| 6,081,871 A | * | 6/2000 | Hwangbo | 711/118 |

FOREIGN PATENT DOCUMENTS

| | | | |
|---|---|---|---|
| EP | 0 558 306 | 1/1993 | ............ G11B/27/28 |
| EP | 0 731 469 | 11/1996 | ............ G11B/27/32 |
| JP | H 2-94066 | 4/1990 | ............ G11B/20/10 |
| WO | WO 93/01596 | 1/1993 | ............ G11B/27/10 |

* cited by examiner

Primary Examiner—Do Hyun Yoo
Assistant Examiner—Nasser Moazzami
(74) Attorney, Agent, or Firm—J. S. Tripoli; R. D. Shedd; D. T. Shoneman

(57) ABSTRACT

The invention relates to a method of access to data sets stored in a bulk memory. During an access time to a data set, the method provides for reading introduction data and exploiting these. This way the method overcomes the problem of long access times in a bulk memory. The method may notably be used when data sets are arranged sequentially on a sequential data carrier, which is for example the case for songs recorded on a magnetic tape. A device for implementing the method is also defined.

15 Claims, 2 Drawing Sheets

METHOD AND DEVICE FOR ACCESSING SETS OF DATA CONTAINED IN MASS MEMORY

FIELD OF THE INVENTION

The present invention relates to a method for accessing sets of data contained in mass memory, and to a device allowing the method-to be implemented. The device may be used particularly in magnetic tape players/recorders.

BACKGROUND

Mass memories are widely used to store relatively large quantities of data. A mass memory requires an information medium which may be formed, for example, by an optically or magnetically readable disk, a magnetic tape or even an electronic circuit on semiconductors. Depending on the mode of reading of the mass memory, and depending on the mode of arranging the data in the mass memory, access for reading the data may require more or less access time. The access time is caused, in large part, by the time which a read device takes to get into position to read the data to be read. The access times may reduce the efficacy of a mass memory when numerous data items arranged in this memory are to be accessed in a non-ordered way. This is the case, for example, of mass memory on a magnetic tape medium. The mass memory may contain data grouped together into sets of data, each set of data representing a song, for example. In order to gain access from one song to another song on the same magnetic tape, the songs being separated by a defined length of this magnetic tape, it is first of all necessary to make the entire defined length of magnetic tape move past the read device.

The problem to which the present invention proposes to afford a solution is that of eliminating certain drawbacks due to the access times during access to data in mass memory.

SUMMARY OF THE INVENTION

One solution to the problem posed, and according to the present invention, is found in a method for accessing a determined set of data among sets of data contained in a mass memory on an information carrier which comprises the steps of:

obtaining a command for access to the determined set of data, after obtaining the command for access, reading introduction data from an introduction memory distinct from the mass memory but on the information carrier, processing the introduction data read from the introduction memory, realizing an access operation to the determined set of data at the same time as the step of processing the introduction data.

The processing of the introduction data may, for example, be the reproduction into music and/or into images when the introduction data are audio or video data.

According to one preferred embodiment of the access method according to the invention, processing is carried out on introduction data which are specific to the set of data which is the subject of the access operation.

The introduction data may, for example, constitute a subset of the set of data to be accessed.

The solution to the problem posed may according to the invention also be seen in a device for accessing sets of data contained in mass memory on an information carrier, access to a determined set of data for reading taking place during an access time. The device comprises an introduction memory containing introduction data, the introduction memory being separate from the mass memory but on the same information carrier. The device further comprises reading means for reading from the introduction memory, command means for obtaining a command for access to the determined set of data and being at least connected to the introduction memory, and processing means for processing the read introduction data, the processing means acting particularly during the time for accessing the determined set of data.

According to one preferred embodiment of the device according to the invention, the device comprises a temporary memory separate from the mass memory, transferring means for transferring at least a part of a set of data from the mass memory into the temporary memory while this set of data is read, further reading means for reading from the temporary memory and reproduction means for reproducing a set of data at a moment later than the reading of this set, these reproduction means being at least linked to the further reading means for reading from the temporary memory.

When the reading of a set of data is coming to an end, it is possible to continue to reproduce the data in deferred mode while, for example, further access is gained to another set of data.

Further characteristics and advantages of the present invention will emerge on reading the description given below of examples in accordance with the present invention, this description being given with reference to the attached drawings in which:

DETAILED DESCRIPTION

Figure 1:
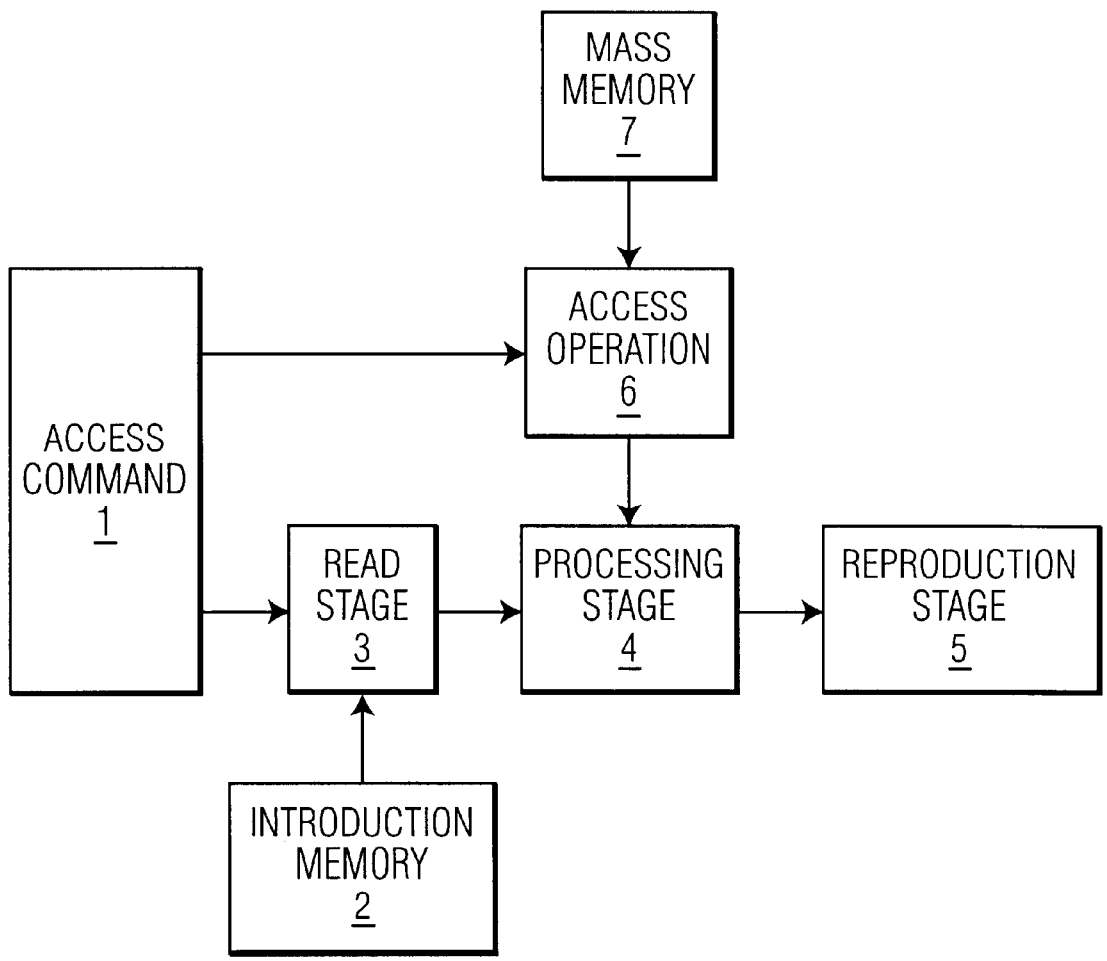
FIG. 1 contains a flow chart of an access method according to the invention.

In FIG. 1, access to a set of data is triggered by an access command 1. On completion of the access command 1, introduction data from an introduction memory 2 are read during a read stage 3. The introduction data read are then subjected to processing 4, which consists, for example, in forwarding these data to a reproduction stage 5. The access command 1 also triggers an operation 6 of accessing a set of data contained in mass memory 7. The reading 3 and processing 4 take place at the same time as the access operation 6. The access operation 6 signals the processing stage 4 after an access time. According to one embodiment of the processing stage 4, the forwarding of the introduction data is interrupted, and it is the data of the set of data accessed which are forwarded to the reproduction stage 5.

According to another embodiment, the processing stage 4 forwards the whole of the introduction data read before forwarding the set of data. This is advantageous, for example, when the introduction data are an advertising item.

The introduction memory 2 may contain introduction data which are specific to the sets of data. In this case, the read stage 3 recognises, in the access command 1, which set has to be accessed, and it is introduction data specific to this set which are read from the introduction memory 2.

The specific introduction data may, for example, constitute a subset of the corresponding set of data, and even more precisely, the start of a song when the set is a song. As the time for accessing each song of the mass memory is variable, the processing stage 4 may be implemented in such a way as to forward to the reproduction 5 only a part of the song accessed during the access operation 6 which has not yet been forwarded during the forwarding of the introduction data at the moment when the access operation 6 terminates and when it signals the processing stage 4. Thus the reproduction 5 of a set of data is uninterrupted and starts at the moment when the access command 1 is given.

The specific introduction data may also consist of several subsets of sets of data, these subsets being related by a characteristic which is common with the set of data to be accessed. When the sets of data are songs, this common characteristic may, for example, be a type of song or a date when the song was published. Hence, during the time for accessing a song of type A, the processing stage 4 forwards to the reproduction 5 introduction data comprising extracts from songs of the same type A.

Figure 2:
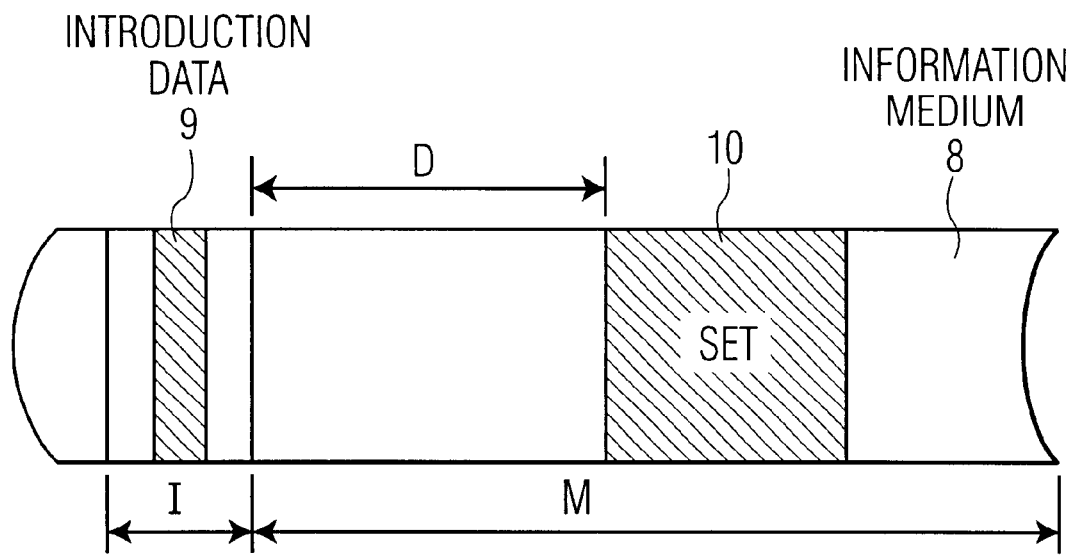
FIG. 2 diagrammatically shows an access device according to the invention.
Figure 2:
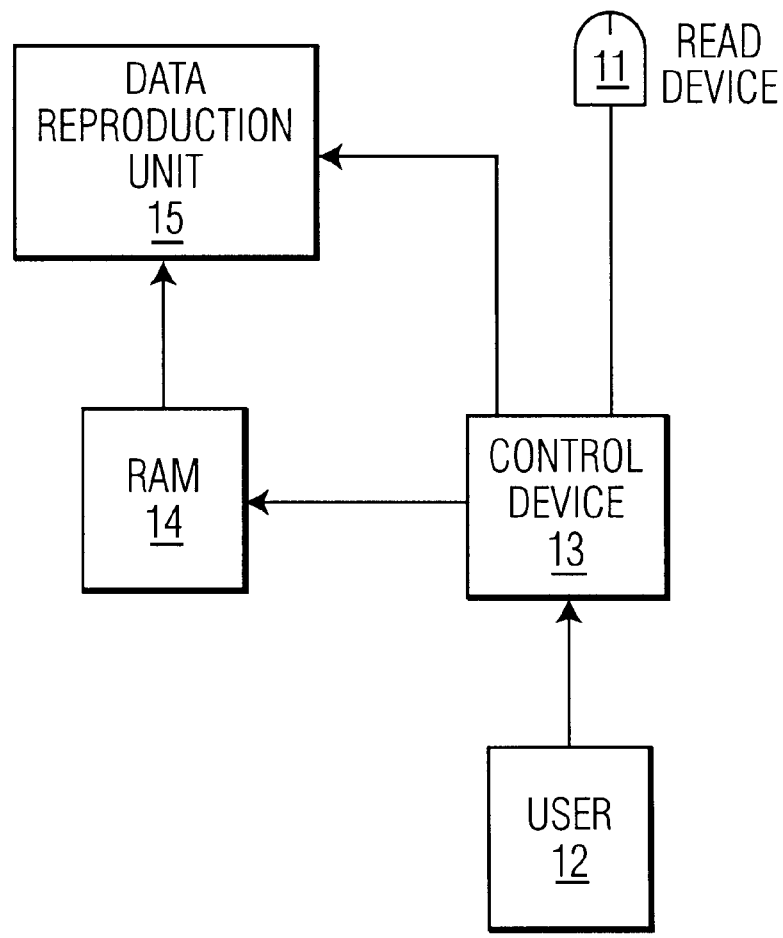

FIG. 2 shows a sequential information medium 8 which may, for example, be a magnetic tape. On the information medium 8, an introduction memory I stores introduction data 9, and a mass memory M stores sets of data arranged sequentially, including a set 10.

The introduction data 9 and the set 10 can be read by the read device 11 when the latter is positioned in front of the medium at the appropriate position. A user 12 controls a control device 13 for accessing the set 10. Following user's command, the read device 11 will read the introduction data 9 and the control device 13 stores the introduction data read in a random-access memory 14. The introduction data are then processed from the random-access memory 14 by a data reproduction unit 15 at the same time as the read device 11 accesses the set 10 for reading. The access time required by the read device 11 to pass from reading the introduction data 9 to reading the set 10 varies particularly as a function of the distance D separating the data 9 and the set 10 on the medium 8.

The reproduction unit 15 and the random-access memory 14 are processing means for processing the introduction data. In the case in which the medium 8 is a magnetic tape for use in a music player, the reproduction unit 15 may be an audio data amplifier.

The reproduction unit 15 may also be used to reproduce the data of the set 10 once they have been read. The control device 13 then transfers the data of the set 10 directly to the reproduction unit 15.

The introduction memory I may contain introduction data which are specific to the sets of data contained in the mass memory M. In this case, for example, only the introduction data specific to the set of data to be accessed are copied into the random-access memory 14 then reproduced. In one variant of the access device, all the specific introduction data are copied into the random-access memory 14, and only the data specific to a set to be accessed are reproduced during the access. Hence the introduction memory does not need to be read every time a set of data has to be accessed.

The specific introduction data may be subsets of the sets of data. Depending on the nature of the sets of data, the subsets may, for example, represent a musical extract, a film trailer, a software module, etc.

In one variant of operation of the device shown in FIG. 2, the data read from the set 10 are still transferred into the random-access memory 14 then reproduced from the random-access memory. When the reading of the set 10 takes place more rapidly than the reproduction of the data from the random-access memory, the reproduction is delayed by comparison with the reading. When the set 10 has been read in its entirety, and when the next command from the control device 13 has to be carried out, the reproduction of the set 10 carries on while the command is being executed.

While the invention has been described in detail with respect to numerous embodiments thereof, it will be apparent that upon a reading and understanding of the foregoing, numerous alterations to the described embodiment will occur to those skilled in the art and it is intended to include such alterations within the scope of the appended claims.

What is claimed is:

1. Method for accessing a determined set of data among sets of data contained in a mass memory on an information medium, comprising:
   (a) receiving a command for access to said determined set of data;
   (b) reading introduction data from an introduction memory distinct from said mass memory but on said information medium;
   (c) processing said introduction data read from said introduction memory; and
   (d) accessing said determined set of data during the step of processing said introduction data.

2. Method according to claim 1 wherein the step of processing is carried out on introduction data which are specific to said determined set of data.

3. Device for accessing sets of data contained in mass memory on an information medium, access to said determined set of data taking place during an access time, the device comprising:
   (a) an introduction memory containing introduction data, said introduction memory being separate from said mass memory but on the same information medium;
   (b) means for obtaining a command for access to said determined set of data;
   (c) first means for reading from said introduction memory after obtaining said command for access; and
   (d) means for processing said introduction data, said processing means acting during the access time for said predetermined set of data.

4. Device according to claim 3, further comprising means for selecting said introduction data related to said determined set of data before access to said determined set of data, said selection means being coupled to said first reading means.

5. Device according to claim 4, wherein said mass memory is a sequential information medium and said determined sets of data are arranged sequentially.

6. Device according to claim 5, wherein said introduction data comprises subsets of sets of data.

7. Device according to claim 6 further comprising:
   (a) a temporary memory separate from said mass memory;
   (b) means for transferring at least a part of said determined set of data from said mass memory into said temporary memory while said determined set of data is read;
   (c) second means for reading from said temporary memory; and
   (d) means for reproducing said determined set of data after reading said determined set of data, said reproduction means being coupled to said second reading means.

8. Device according to claim 7 wherein said sequential information medium is a magnetic tape.

9. Device according to claim 8 wherein said determined sets of data are audio and/or video sequences.

10. A method for processing information resident on an information medium, said information comprising a determined set of data among sets of data contained in a mass memory on said information medium, and introduction data contained in introduction memory distinct from said mass memory but on said information medium, said method comprising:

(a) receiving a command for access to said determined set of data contained in said mass memory;

(b) reading said introduction data from said introduction memory;

(c) processing said introduction data having been read from said introduction memory;

(d) accessing said determined set of data during the step of processing said introduction data; and (e) processing said determined set of data accessed upon termination of processing of said introduction data.

11. The method of claim 10, wherein the step (e) of processing said determined set of data accessed upon termination of processing of said introduction data comprises interrupting the processing of said introduction data from said introduction memory and processing said accessed determined set of data from said mass memory.

12. The method of claim 11, wherein said introduction data comprises a subset of said determined set of data.

13. The method of claim 10 wherein said information medium comprises a magnetic tape.

14. The method of claim 10, wherein the processing step (c) comprises reproducing said introduction data.

15. The method of claim 11, wherein the processing step (e) further comprises reproducing said determined set of data.

* * * * *